(12) United States Patent
Vain et al.

(10) Patent No.: US 12,478,317 B2
(45) Date of Patent: Nov. 25, 2025

(54) METHOD AND DEVICE FOR MEASURING OR DETERMINING AT LEAST ONE BIOMECHANICAL PARAMETER OF SOFT BIOLOGICAL TISSUES

(71) Applicants: VANDERBILT UNIVERSITY, Nashville, TN (US); UNIVERSITY OF TARTU, Tartu (EE); THE UNIVERSITY STATES AS REPRESENTED BY THE DEPARTMENT OF VETERANS AFFAIRS, Washington, DC (US)

(72) Inventors: Arved Vain, Tartu (EE); Eric Tkaczyk, Nashville, TN (US); Mihkel Põldemaa, Tallinn (EE)

(73) Assignees: VANDERBILT UNIVERSITY, Nashville, TN (US); UNIVERSITY OF TARTU, Tartu (EE)

( * ) Notice: Subject to any disclaimer, the term of this patent is extended or adjusted under 35 U.S.C. 154(b) by 976 days.

(21) Appl. No.: 17/441,858

(22) PCT Filed: Mar. 23, 2020

(86) PCT No.: PCT/US2020/024194
§ 371 (c)(1),
(2) Date: Sep. 22, 2021

(87) PCT Pub. No.: WO2020/198131
PCT Pub. Date: Oct. 1, 2020

(65) Prior Publication Data
US 2022/0183617 A1    Jun. 16, 2022

(30) Foreign Application Priority Data
Mar. 22, 2019  (GB) .................................... 1904010

(51) Int. Cl.
*A61B 5/00* (2006.01)
*A61B 9/00* (2006.01)

(52) U.S. Cl.
CPC ............ *A61B 5/442* (2013.01); *A61B 5/0053* (2013.01); *A61B 5/4519* (2013.01); *A61B 9/00* (2013.01)

(58) Field of Classification Search
CPC ..... A61B 5/0053; A61B 5/442; A61B 5/4519; A61B 9/00
See application file for complete search history.

(56) References Cited

U.S. PATENT DOCUMENTS 4,513,737 A * 4/1985 Mabuchi ............ A61H 23/0254
                                                   601/108
5,524,636 A   6/1996 Sarvazyan et al.
(Continued)

FOREIGN PATENT DOCUMENTS

WO    WO 1997/035521      10/1997
WO    WO-2005002428 A1 *  1/2005  ........... A61B 5/0053
(Continued)

OTHER PUBLICATIONS

Vain, A., "The phenomenon of mechanical stress transmission in skeletal muscles," Acta Academiae Olympiquae Estoniae, 14, 38-48 (2006). Abstract only.

*Primary Examiner* — Charles A Marmor, II
*Assistant Examiner* — Andrew E Hoffpauir
(74) *Attorney, Agent, or Firm* — Lippes Mathias LLP

(57) ABSTRACT

A method of measuring a biomechanical parameter of soft biological tissue is described. The method includes a pre-measurement process wherein an impulse applying device applies a pre-pressure to a surface of the tissue via an end portion contacting the tissue surface. While maintaining the pre-pressure, the device generates at least two impulses separated by a time interval, each impulse causing the end (Continued)

portion to impart to the tissue an action with certain parameters, each action inducing a response of the tissue. A value of a biomechanical parameter of the tissue is determined from each response induced. A determination is made as to whether the determined values of the biomechanical parameter are sufficiently similar to each other to indicate that the pre-pressure, the parameters of the end portion actions and the time interval are acceptable for use in a measurement process to be conducted on the surface of the tissue.

18 Claims, 2 Drawing Sheets

(56) References Cited

U.S. PATENT DOCUMENTS

| | | | |
|---|---|---|---|
| 6,132,385 A * | 10/2000 | Vain | A61B 9/005 600/553 |
| RE47,997 E * | 5/2020 | Pedicini | A61B 17/92 |
| 2002/0004630 A1 * | 1/2002 | Sarvazyan | A61B 5/0053 600/372 |
| 2004/0079155 A1 * | 4/2004 | Omata | A61B 5/4244 702/56 |
| 2009/0326425 A1 * | 12/2009 | Heine | A61H 1/008 601/108 |
| 2011/0172565 A1 * | 7/2011 | Shih | A61B 8/085 600/587 |
| 2011/0311944 A1 | 12/2011 | Earthman et al. | |
| 2013/0289365 A1 * | 10/2013 | Vain | A61B 5/103 600/301 |
| 2015/0051513 A1 | 2/2015 | Hunter et al. | |
| 2015/0272440 A1 * | 10/2015 | Smith | A61B 5/72 600/587 |
| 2015/0374275 A1 * | 12/2015 | Peipsi | A61B 5/442 600/587 |
| 2016/0058365 A1 * | 3/2016 | Bowman | A61B 5/0051 600/552 |
| 2017/0061621 A1 * | 3/2017 | Wortman | G06T 7/0016 |
| 2018/0042495 A1 * | 2/2018 | Moon | A61B 5/349 |
| 2019/0059804 A1 | 2/2019 | Shiakolas et al. | |
| 2019/0183344 A1 * | 6/2019 | Gallippi | A61B 8/08 |
| 2019/0331573 A1 | 10/2019 | Earthman et al. | |
| 2020/0375464 A1 * | 12/2020 | Verwulgen | A61B 5/30 |
| 2020/0390362 A1 * | 12/2020 | Westerhof | A61B 5/6843 |

FOREIGN PATENT DOCUMENTS

| | | |
|---|---|---|
| WO | WO 2014/122011 A1 | 8/2014 |
| WO | WO 2018/126244 A1 | 7/2018 |

* cited by examiner

METHOD AND DEVICE FOR MEASURING OR DETERMINING AT LEAST ONE BIOMECHANICAL PARAMETER OF SOFT BIOLOGICAL TISSUES This application claims the priority of International Application PCT/US2020/024194, filed Mar. 23, 2020, and GB 1904010.4, filed Mar. 22, 2019, from which the PCT application claims priority, the disclosures of which are incorporated herein in their entireties, by reference.

FIELD OF THE INVENTION

The invention relates to methods and devices for measuring or determining at least one biomechanical parameter of soft biological tissue, and to systems and computer program products for measuring or determining at least one biomechanical parameter of soft biological tissue. More particularly but not exclusively the invention relates to the non-invasive measurement of the biomechanical parameters of soft biological tissues and a statistical assessment of their state and properties in real time for evidence-based medicine and other fields.

BACKGROUND OF THE INVENTION

In medicine and biology, evaluating the parameters related to vital functions of organs and tissues is important. In assessing the health status of a person, the state of the biological tissues along with properties that characterize the prerequisites for carrying out vital motions and movements, the conditions of microcirculation of blood, lymph and tissue fluid, and readiness of tissues to operate at extreme conditions should be taken into account. For disease prevention, it is important to know the parameters that describe vital functions in the soft biological tissues. Knowledge of the parameters allows predicting changes in tissues brought about by pathological processes. Early detection of accompanying symptoms is a key to a timely diagnosis and successful treatment of the disease. The human organism is an integral whole and the onset of a disease may first show as changes in the state and properties of skeletal muscles or skin (epidermis).

Due to the complex composition and time-dependent behaviour of the tissues, using traditional engineering terminology and methods does not allow for thorough understanding of why and how exactly the parameters that describe certain properties of soft biological tissue change. Therefore, a new term must be introduced—the biomechanical parameters of soft biological tissue: biomechanical and viscoelastic properties, state of mechanical stress, resilience, etc., that characterize the behaviour of and changes in the live tissue in different situations and states.

The principle of operation of a myometer, or impulse applying device, is simple. The device's actuator generates a single mechanical impulse, lasting milliseconds, which is transferred to the soft biological tissue via a testing end, inducing a deformation in the range of a few millimeters. If the tissue under assessment has any elastic properties, the soft biological tissue responds, after a quick release (end of actuation), to the stimulus with a damped natural oscillation. The latter signal characterizes the response of a live tissue to a mechanical stimulus, which reflects the present state of the tissue and the corresponding biomechanical parameters. However, there currently is no method to adjust the parameters of a single mechanical impulse individually, before starting the measurement, in order to select appropriate parameters, such that they do not alter the results.

Impulse applying devices are known from WO 97/35521 and US 2013/0289365.

DISCLOSURE OF INVENTION

Viewed from a first aspect, the invention provides a method of noninvasively measuring a biomechanical parameter of soft biological tissue, using an impulse applying device including a movable testing body having an end portion to be placed in contact with a surface of the tissue, the method including a pre-measurement process which includes:
  the impulse applying device applying a pre-pressure to the surface of the tissue via the end portion in contact with the surface of the tissue;
  whilst maintaining the pre-pressure, the impulse applying device generating at least two impulses separated by a time interval, each impulse causing the end portion to impart to the tissue an action with certain parameters, and each of the end portion actions inducing a response of the tissue;
  determining a value of a biomechanical parameter of the tissue from the response induced by each end portion action; and
  determining if the values of the biomechanical parameter determined from the response induced by each end portion action are sufficiently similar to each other to indicate that the pre-pressure, the parameters of the end portion actions and the time interval are acceptable for a measurement process to be conducted on the surface of the tissue using the same pre-pressure, a plurality of end portion actions with the same parameters and the same time interval.

The method of the first aspect of the invention extends to a system and any of its optional features (discussed further below).

Thus, according to the first aspect of the invention, there is provided a system for noninvasively measuring a biomechanical parameter of soft biological tissue, the system being configured to carry out a pre-measurement process, and the system including:
  an impulse applying device for applying a pre-pressure to the surface of the tissue, the impulse applying device including a movable testing body having an end portion to be placed in contact with a surface of the tissue, and the impulse applying device being configured to generate at least two impulses separated by a time interval whilst maintaining the pre-pressure, each impulse causing the end portion to impart to the tissue an action with certain parameters so that each end portion action induces a response of the tissue, and the impulse applying device including a sensor for determining the responses of the tissue;
  and the system further including data processing means configured to receive from the sensor data relating to the responses of the tissue and to determine a value of a biomechanical parameter of the tissue from the response induced by each end portion action, and configured to determine if the values of the biomechanical parameter determined from the response induced by each end portion action are sufficiently similar to each other to indicate that the pre-pressure, the parameters of the end portion action and the time interval are acceptable for a measurement process to be conducted on the surface of the tissue using the system to apply the same pre-pressure, and to generate a plurality of impulses separated by the same time interval to impart to the tissue a plurality of end portion actions with the same parameters.

The data processing means may be provided as part of the impulse applying device. Therefore, the impulse applying device may comprise the data processing means. Alternatively, the data processing means may be provided in a separate computing unit.

The impulse applying device may comprise a display. This display can indicate that the pre-pressure, the parameters of the end portion action and the time interval are acceptable for a measurement process to be conducted on the surface of the tissue. Alternatively, a separate computing unit may comprise a display which provides the indication.

According to the first aspect of the invention, a computer program may be provided, including instructions to cause the data processing means of the system to receive from the sensor data relating to the responses of the tissue and to determine a value of a biomechanical parameter of the tissue from the response induced by each end portion action, and to determine if the values of the biomechanical parameter determined from the response induced by each end portion action are sufficiently similar to each other to indicate that the pre-pressure, the parameters of the end portion action and the time interval are acceptable for a measurement process to be conducted on the surface of the tissue using the system to apply the same pre-pressure, and to generate a plurality of impulses separated by the same time interval to impart to the tissue a plurality of end portion actions with the same parameters.

There may also be provided a computer readable medium having stored thereon the computer program.

The method of measuring a biomechanical parameter of soft biological tissue can achieve improved accuracy and reliability.

Inaccuracy of the measurement of a biomechanical parameter may result from the pre-pressure being too small or too large. Too small a pre-pressure may result in the end portion not maintaining continuous contact with the surface of the tissue. Such continuous contact is desirable as it means that data relating to the responses of the tissue may be obtained by measuring the movement of the end portion (using e.g. the sensor). Too large a pre-pressure may result in the tissue recovering inadequately after one impulse before the next is generated.

Inaccuracy may be result from the parameters of the end portion action being such that the tissue does not recover adequately after end portion action before the next is it caused. On the other hand, the end portion action needs to be of sufficient magnitude to obtain a relatively easily measurable response.

Inaccuracy may result from the interval of time between successive impulses being too short, so that the tissue has insufficient time to recover from one end portion action caused by one impulse before the next impulse causes the next end portion action. However, by providing a relatively short time interval, more impulses and consequent end portion actions can occur within a shorter time period, improving practicality when conducting clinical tests.

It will be appreciated therefore that it is desirable to carry out the measurement process with a suitable pre-pressure, parameters of the end portion action and time interval between impulses. According to the invention, the pre-measurement process is used to determine the suitability of these parameters. The inventors have recognized that inadequate tissue recovery after end portion action before the next end portion action can lead to inaccuracies, for the reasons explained above. Therefore, according to the invention in its first aspect, it is advantageous to determine that the values of the biomechanical parameter determined from the response induced by each end portion action are sufficiently similar to each other. If they are, that suggests that tissue recovery from the end portion actions is adequate to lead to good results when carrying out the measurement process.

If it is determined that the data is such as to indicate that the pre-pressure, parameters of the end portion action and time interval between impulses are acceptable, then the measurement process may be conducted using the same pre-pressure, a plurality of end portion actions with the same parameters and the same time interval, as compared to the pre-measurement process. Alternatively, the results of the pre-measurement process may be used as the results of the measurement process.

If however the determination is that the pre-pressure, the parameters of the end portion actions and the time interval are not acceptable for a measurement process to be conducted using the same pre-pressure, parameters of the end portion actions and time interval, the method may comprise a subsequent pre-measurement process which includes:
the impulse applying device applying to the surface of the tissue a subsequent pre-pressure, and whilst maintaining the subsequent pre-pressure, generating at least two subsequent impulses separated by a subsequent time interval each to cause the end portion to impart to the tissue a subsequent end portion action, at least one of the subsequent pre-pressure, the parameters of the at least two subsequent end portion actions and the time interval being modified;
determining a value of the biomechanical parameter of the tissue from the response induced by each subsequent end portion action; and
determining if the values of the biomechanical parameter determined from the response induced by each subsequent end portion action are sufficiently similar to each other to indicate that the subsequent pre-pressure, the parameters of the subsequent end portion actions and the subsequent time interval are acceptable for the measurement process to be conducted on the surface of the tissue using the same subsequent pre-pressure, a plurality of end portion actions with the same parameters as the subsequent end portion actions, and the same time interval as the subsequent time interval.

In embodiments, the subsequent pre-measurement process is carried out at a different pre-measurement point from the point used for the first pre-measurement process, but in the same area of investigation. This is because the tissue first tested may not have recovered adequately in time for the subsequent pre-measurement process.

The method may comprise as many subsequent pre-measurement processes as is necessary to obtain acceptable subsequent data i.e. subsequent data which is such as to indicate that the subsequent pre-pressure, the parameters of the subsequent end portion actions and the subsequent time interval are acceptable for the measurement process using the subsequent pre-pressure, a plurality of end portion actions with the same parameters as the subsequent end portion action and the subsequent time interval. In carrying out such subsequent pre-measurement processes, the impulse applying device each time applies to the surface of the tissue a subsequent pre-pressure, at least two subsequent end portion actions generated by respective impulses at the subsequent time interval, with at least one of the subsequent pre-pressure, the parameters of the at least one subsequent impulse and the time interval being modified, compared to a previously carried out measurement process.

The method may comprise conducting the measurement process after one or more pre-measurement processes have been carried out. The measurement process may comprise:
the impulse applying device applying a pre-pressure to the surface of the tissue, the pre-pressure being the same as that used in the first or a subsequent pre-measurement process; and
the impulse applying device generating a plurality of impulses separated by a time interval, each impulse causing the end portion to impart to the tissue an action with certain parameters, the certain parameters being the same as those used in the first or a subsequent pre-measurement process, and the time interval being the same as that used in the first or a subsequent pre-measurement process.

By applying a pre-pressure to the surface of the tissue using the end portion of the movable testing body, the end portion can be maintained in contact with the surface of the tissue. The pre-pressure can ensure that the end portion stays in contact with the surface of the tissue after the at least two impulses. This means that measurements relating to the motion of the end portion can be used to determine motion parameters of the surface of the tissue. For example, a sensor in the form of an accelerometer may be rigidly attached to the movable testing body, so that acceleration of the part of the movable testing body where the accelerometer is attached may be measured. Such acceleration measurements can be used to determine acceleration of the end portion, and hence acceleration of the surface the tissue.

The pre-pressure may be caused by the weight of the movable testing body when in a reference orientation, for example when the end portion of the movable testing body is in a vertical orientation and is above the tissue. This corresponds to the pre-pressure and the end portion actions occurring in the same direction as the direction of gravity. The impulse applying device may include means, such as for example an actuator, for acting on the movable testing body to control the pre-pressure. The action of such means can be kept constant during application of the at least one impulse, so that the pre-pressure is maintained constant during the pre-measurement process. Similarly, it can be kept constant during the measurement process. Control of the pre-pressure is desirable in order that it can be at a desired level independent of the orientation of the impulse applying device. The orientation may vary because the user places the end portion against the surface of the tissue at an angle to the reference orientation, e.g. vertical orientation, for ease of use. The orientation may vary because the user tilts the impulse applying device. This may happen because of the desirability of the whole of an end area of the end portion making contact with the tissue. The control may be effected in response to an output signal from an accelerometer rigidly attached to the movable testing body for determining the orientation of the movable testing body relative to the direction of gravity.

The action on the movable testing body to control the pre-pressure may be positive, i.e. to provide an increased pre-pressure relative to what would be available when caused by the weight of the movable testing body alone. The action may be negative, i.e. to provide a reduced pre-pressure relative to what would be available when caused by the weight of the movable testing body alone. A positive or negative action can be provided in response to the output signal from the accelerometer.

A negative action can effectively reduce the pre-pressure caused by the weight of the movable testing body. This may be useful for example if the results of pre-measurement indicate non-acceptability for the measurement process to be conducted, due to the dissimilarity of the values of the biomechanical parameter determined from the at least two responses induced by each end portion action. A cause may be that the pre-pressure is too high. In those circumstances the other modifiable settings of the impulse applying device, such as the weight of the movable testing body or the duration of the impulse, or the size of the end area of the end portion, may be at their limit and cannot be modified further to reduce the pre-pressure. This may apply for example when measuring small muscles. Then the means for acting on the movable testing body can provide a negative action to reduce the pre-pressure caused by the weight of the movable testing body.

It is desirable for the method of noninvasively measuring a biomechanical parameter of soft biological tissue to be carried out whilst remaining in the elastic region of the tissue. Thus, the application of the pre-pressure and the at least two end portion actions should not result in the pressure acting on the tissue exceeding the elastic limit of the tissue. In embodiments, by staying within the elastic limit the tissue can fully recover by the time of the next end portion action. With an acceptable combination of the pre-pressure, parameters of the at least two end portion actions, and the time interval, the biomechanical parameters determined from the tissue responses should be sufficiently similar to indicate acceptability for the measurement process to be conducted.

However, when carrying out the pre-measurement process, the pre-pressure, the parameters of the at least two impulses may not be such as to generate such favorable indicative data, in which case a subsequent pre-measurement process, as discussed above, is needed. One of, two of, or all three of the pre-pressure, the parameters of the at least two impulses and the time interval may be modified compared to the pre-measurement process carried out first.

In embodiments, the subsequent pre-pressure is modified compared to the pre-pressure used in the pre-measurement process carried out first (or previously).

In embodiments, at least one of the parameters of the at least two subsequent end portion actions is modified compared to the respective parameter of the at least one impulse used in the pre-measurement process carried out first. A parameter of the at least two subsequent impulses which is modified may be the force per unit area applied by the end portion of the movable testing body to the tissue. This may be done for example by the impulse applying device using a second, different end portion to apply the at least two subsequent impulses. Such a second end portion may have a different end area from that of the end area of the first end portion used in the pre-measurement process carried out first (or previously). It is desirable that both end portions have the same mass so that replacing the first end portion with the second end portion does not affect the weight of the movable testing body, so that for example there is no change in the pre-pressure caused by the weight of the movable testing body when in the reference orientation, e.g. the vertical orientation.

The impulse applying device may comprise a plurality of end portions, each end portion having a different end area for contact with the tissue. Each end portion may have the same mass.

In practice, the impulse applying device comes with a set of testing ends of with the same mass but end areas of different diameters. The diameter may be in a range of 0.5 to 100 mm, preferably 1 to 20. The diameter may be 3 mm, 5 mm, 8 mm, 10 mm or 12 mm. It may be desirable to carry out the pre-measurement process with an end portion having a relatively small diameter end area, and if the results indicate non-acceptability for a measurement process to be conducted, then to increase to e.g. a 5 mm one. By increasing the diameter of the end area, the force/mm$^2$ on the tissue is reduced and this should diminish the residual strain. Generally, it will be desirable to use a testing end with an end area with a smaller diameter, because the bigger the force/mm$^2$, the deeper the measurement goes, so a larger response e.g. natural oscillations of the tissue is obtained. If however it is desired to investigate only the most superficial tissues, a testing end with an end area with a large diameter will be useful.

The mass of the movable testing body may be between 1 and 40 g, preferably between 5 and 20 g, more preferably between 14 and 18 g. In an embodiment, the mass is 18 g. Larger masses would be used on larger muscles. A mass such as 40 g would generally be suitable for big animals, i.e. veterinary applications.

A parameter of the at least one subsequent impulse which is modified may be the duration of the impulse.

The impulse applying device may comprise means for acting on the movable testing body to generate the at least two impulses, and, if necessary, the subsequent impulses. In embodiments, the means for acting on the movable testing body to control the pre-pressure, such as an actuator, may also be for acting on the movable testing body to generate the at least two impulses, and, if necessary, the subsequent impulses. Such means may be controllable to control the duration of the at least two impulses or the subsequent impulses.

In general, if the values of the biomechanical parameter determined from the response induced by each end portion action are not sufficiently similar to indicate acceptability for the measurement process to be conducted, this may be because tissue recovery is insufficient. The pressure applied to the tissue is the combination of the pre-pressure and the pressure caused by the end portion action and so if tissue recovery is insufficient it is likely that at least one of the pre-pressure and the parameters of the end portion action needs to be modified by being reduced, and/or the time interval needs to be modified by being increased. Thus the subsequent pre-pressure may be reduced compared to the pre-pressure used first, and/or at least one parameter of the at least two subsequent end portion actions (such as the force per unit area applied by the end portion or the duration of the end portion action) may be reduced compared to the corresponding parameter of the end portion action used first.

In the case of reducing the pre-pressure, this may for example be achieved by the second end portion having an end area of greater area than the first (or previously) used end portion. In the case of the parameter of the impulse being the force per unit area, this may be reduced by the second end portion having an end area of greater area than the first (or previously) used end portion. In the case of the parameter of the impulse being the duration thereof, the at least one subsequent impulse may be modified by having a duration reduced compared to the impulse first (or previously) used.

A parameter of the at least one subsequent end portion action which is modified may comprise the time interval separating the at least two impulses. The time interval is the amount of time between the end of one impulse and the start of the next impulse, this amount of time being available for the tissue to recover from the end of one action of the end portion before the next action begins. The time interval depends on the frequency of the impulses, which should be low enough to ensure the presence of the time interval.

The time interval may be one second or less. As mentioned, it is desirable to use a relatively short time interval, because in clinical practice this will reduce the total time required to carry out the pre-measurement process and subsequently (if needed) the measurement process. When carrying out the pre-measurement process the time interval may be initially selected to be as low as possible, allowing this parameter to be increased if the values of the biomechanical parameter determined from the response induced by each end portion action are not sufficiently similar to each other to indicate acceptability for the measurement process to be conducted. When acceptable results are obtained with a given time interval, further measurement may be conducted with this time interval or a longer time interval.

The frequency of impulse generation may be in the range of 10-30 per second. In an embodiment, a frequency of 20 impulses per second is used. The impulses may be generated over a one second period, so there the measurements in the pre-measurement process would take one second and would involve 20 impulses. The impulses may be generated over a period from 0.5-4 seconds, preferably 0.5-3 seconds.

The frequency of impulses may also be in the range of 0.1 to 10 per second. In an embodiment, a frequency of 1 impulse per second is used As mentioned, the means for acting on the movable testing body to generate the at least two impulses may be an actuator. Each impulse generated by the actuator may have a constant power, for example 20 W. This is suitable for use on humans, and if working on bigger mammals than humans, such as a horse, the power may for example be 30 W. Depending on the choice of end portion, the impulse may have a power between 0.002 to 100, or 0.01 to 25, or 0.17 to 2.9 W/mm$^2$. The impulse duration should be constant and have a value between 3 and 30 ms, preferably 10 and 20 ms, more preferably about 15 ms. The impulse may be followed by a quick release in the range 0.1-15 ms, for example 1.5 ms in an embodiment, and the time for achieving the maximum impulse in the range 1-5 ms, for example 1.5 in an embodiment.

The signal delivered to the actuator is preferably rectangular. This means that each impulse reaches maximum value very quickly and reduces again to zero very quickly The signal may be provided from a control means such as a microprocessor.

The determining of the value of a biomechanical parameter from the at least two responses induced by the respective end portion actions may comprise determining the amount of tissue recovery from the respective end portion action. This can be done by a sensor or a camera for monitoring the position of the end portion or another part of the movable testing body. It can be done by using an accelerometer rigidly attached to the movable testing body, to provide acceleration data which can be used to determine position data of the end portion. A biomechanical parameter the value of which may be determined from the amount of tissue recovery from the respective end portion actions may be stiffness.

More particularly, the variation in the values of the stiffness obtained from applying at least two impulses is a useful biomechanical parameter to assess whether the conditions are right for an accurate measurement process to be carried out, in that low variation in those values tends to correspond to good tissue recovery after one end portion action before the next is applied.

The inventors have observed that when the stiffness values from one impulse to the next have an increasing trend, the measurement results are not reliable. Therefore, changes to the parameters of the at least two impulses, so modifying the end portion actions, for example decreasing the pre-pressure, decreasing the force per unit area applied by the end area to the tissue, or increasing the time interval between impulses, has been found to result in consecutive measurements from a plurality of end portion actions (for example 10 such actions) yielding approximately the same results.

In a method of the embodiments, the biomechanical parameter of the tissue is its stiffness, and the pre-measurement process further includes:
for each of the end portion actions, determining a value of stiffness of the tissue to obtain a plurality of values of stiffness each corresponding to a respective end portion action; and
the determining if the values of the biomechanical parameter determined from the response induced by each end portion action are sufficiently similar being done by performing a statistical analysis to determine a variation of the values of stiffness.

In embodiments, at least 5 or 10 or 15 or 20 or 25 or 30 or 35 or 40 impulses are generated to cause the end portion to impart to the tissue a corresponding number of end portion actions each having the certain parameters. It has been found that 10 impulses works well, allowing for the statistical analysis to involve deleting outlier results.

The method may further comprise determining that the variation is within an acceptable range. If so, it is determined that the pre-pressure, the parameters of the at least two end portion actions and the time interval are acceptable for the measurement process to be conducted using those settings. If the variation is outside the acceptable range, it is determined that the pre-pressure, the parameters of the at least two end portion actions are not acceptable for the measurement process to be conducted. In that case, a subsequent pre-measurement process can be carried out as described above.

The determining from a statistical analysis may involve determining if any of the individual values of stiffness are within the acceptable range, or lie outside the acceptable range. Alternatively, a selection of values of stiffness may be made as part of the statistical analysis after the mean and the standard deviation are initially calculated.

Thus, the statistical analysis may comprise:
determining the mean of the values of stiffness;
determining the standard deviation of the values of stiffness;
selecting and discarding any of the plurality of values of stiffness that are greater than or less than the mean by more than a multiplier of the standard deviation;
determining a new mean of the values of stiffness not discarded;
determining a new standard deviation of the values of stiffness not discarded;
wherein the variation determined by the statistical analysis includes the new standard deviation.

By selecting and discarding any of the plurality of stiffness values that are greater than or less than the mean by more than a multiplier of the standard deviation, outlier or anomalous stiffness values will be discarded, so improving the effectiveness of the statistical analysis. The multiplier may be 2.

The method may further comprise:
determining if all of the individual values of stiffness which are not discarded are inside an acceptable range, the acceptable range being +/− a multiplier of the new standard deviation from the new mean; and
if all such individual values are inside the acceptable range, determining that the pre-pressure and the parameters of the impulse are acceptable for the measurement process to be conducted.

The multiplier of the new standard deviation may be 0.5. Thus, the acceptable range would be +/−0.5 of the new standard deviation from the new mean.

In embodiments, the biomechanical parameter of the tissue is its stiffness and the stiffness $S_1$ is defined by the formula:

$$S_1 = \frac{m_t * a_2}{\Delta l_1}$$

where
$m_t$ is the effective mass of the movable testing body, the effective mass being a mass value as if the whole of the movable testing body is being decelerated by $a_2$,
$a_2$ is the maximum deceleration of the end portion, occurring when the tissue is maximally inwardly deformed by the at least one impulse, and
$\Delta l_1$ is the maximum inward deformation of the tissue caused by the at least one end portion action.

The mass of the movable testing body will be a known mass, and its mounting arrangement (for example if a portion thereof is being rotationally decelerated so that not all of that portion is being decelerated by $a_2$) will also be known, allowing the effective mass to be calculated. In embodiments in which an accelerometer is rigidly connected to the movable testing body, the maximum deceleration of the end portion can be determined from the accelerometer. Again, the location of the movable testing body to which the accelerometer is rigidly connected will be known, allowing this determination to be made even if the accelerometer is not decelerating at the same rate as the end portion. The displacement of the end portion can be detected by a camera or a sensor, so allowing the maximum inward deformation of the tissue to be determined. Alternatively, acceleration data from the accelerometer can be used to determine the velocity of the end portion and the position of the end portion.

The method may comprise conducting the measurement process after one or more pre-measurement processes have been carried out The method may comprise conducting the measurement process, the measurement process including:
the impulse applying device applying a pre-pressure to the surface of the tissue via the end portion in contact with the surface of the tissue, the pre-pressure being the same as that used in the first or a subsequent pre-measurement process (for example the last pre-measurement process); and
whilst maintaining the pre-pressure, the impulse applying device generating at least one impulse causing the end portion to impart to the tissue an action with certain parameters, the certain parameters being the same as those used in the first or a subsequent pre-measurement process, and the end portion action inducing a response in the form of natural oscillations of the tissue; and wherein the method further includes:
determining the biomechanical parameter of different portions of the tissue extending from the surface of the tissue to different depths, based on assessing data relating to the natural oscillations of the tissue during different durations having a start time and a finish time, the different durations having different starting times.

The number of portions may be comprised between 2 and 10, preferably between 2 and 4. For example, the number of portions may be 2, 3 or 4.

The method may comprise conducting the measurement process, the measurement process including:
the impulse applying device applying a pre-pressure to the surface of the tissue via the end portion in contact with the surface of the tissue, the pre-pressure being the same as that used in the first or a subsequent pre-measurement process; and whilst maintaining the pre-pressure, the impulse applying device generating at least one impulse causing the end portion to impart to the tissue an action with certain parameters, the certain parameters being the same as those used in the first or a subsequent pre-measurement process, and the end portion action inducing a response in the form of natural oscillations of the tissue; and
wherein the method further includes:
determining the biomechanical parameter of a first portion of the tissue extending from the surface of the tissue to a first depth, based on assessing data relating to the natural oscillations of the tissue during a first duration having a start time and a finish time; and
determining the biomechanical parameter of a second portion of the tissue extending from the surface of the tissue to a second depth which is less than the first depth, based on assessing data relating to the natural oscillations of the tissue during a second duration having a start time and a finish time, the start time of the second duration being later than the start time of the first duration. The invention may thus extend to a system for noninvasively measuring a biomechanical parameter of soft biological tissue, the system including an impulse applying device for applying a pre-pressure to the surface of the tissue and for applying at least one action to the tissue to cause natural oscillations of the tissue, a sensor for determining data relating to the natural oscillations of the tissue, and data-processing means, the data processing means being configured to receive the data from the sensor and being configured to determine from the data the biomechanical parameter of a first portion of the tissue extending from the surface of the tissue to a first depth, based on assessing the natural oscillations of the tissue during a first duration having a start time and a finish time, and the data processing means being configured to determine the biomechanical parameter of a second portion of the tissue extending from the surface of the tissue to a second depth which is less than the first depth, based on assessing the natural oscillations of the tissue during a second duration having a start time and a finish time, the start time of the second duration being later than the start time of the first duration.

The data-processing means may be provided as part of the impulse applying device. Therefore, the impulse applying device may comprise the data-processing means. Alternatively, the data-processing means may be provided in a separate computing unit.

The impulse applying device may comprise a display. This display can indicate the biomechanical parameters determined for the first and second portions of the tissue. Alternatively, a separate computing unit may comprise a display which provides this information.

A computer program may be provided, including instructions to cause the data-processing means of the system to receive from the sensor data relating to the natural oscillations of the tissue, and to determine from the data the biomechanical parameter of a first portion of the tissue extending from the surface of the tissue to a first depth, based on assessing the natural oscillations of the tissue during a first duration having a start time and a finish time, and the data processing means being configured to determine the biomechanical parameter of a second portion of the tissue extending from the surface of the tissue to a second depth which is less than the first depth, based on assessing the natural oscillations of the tissue during a second duration having a start time and a finish time, the start time of the second duration being later than the start time of the first duration.

There may also be provided a computer readable medium having stored thereon the computer program.

The inventors have recognized that a first part of the natural oscillations of the tissue to which an impulse is applied can provide information about the tissue from the surface to a relatively deep depth, whereas a later part of the natural oscillations of the tissue can provide information about the tissue from the surface to a shallower depth. This is of independent patentable significance.

Viewed from a second aspect, the invention provides a method of determining at least one biomechanical parameter of soft biological tissue, the method using data obtained from a measurement process in which at least one action is applied to the surface of the tissue to cause natural oscillations of the tissue, the method including:
determining the at least one biomechanical parameter of a first portion of the tissue extending from the surface of the tissue to a first depth, based on assessing data relating to the natural oscillations of the tissue during a first duration having a start time and a finish time; and
determining the at least one biomechanical parameter of a second portion of the tissue extending from the surface of the tissue to a second depth which is less than the first depth, based on assessing data relating to the natural oscillations of the tissue during a second duration having a start time and a finish time, the start time of the second duration being later than the start time of the first duration.

Also according to the second aspect, the invention includes a system for determining at least one biomechanical parameter of soft biological tissue, the system using data obtained from a measurement process in which at least one action is applied to the surface of the tissue to cause natural oscillations of the tissue, the system including data processing means configured to determine the at least one biomechanical parameter of a first portion of the tissue extending from the surface of the tissue to a first depth, based on assessing data relating to the natural oscillations of the tissue during a first duration having a start time and a finish time, and configured to determine the at least one biomechanical parameter of a second portion of the tissue extending from the surface of the tissue to a second depth which is less than the first depth, based on assessing data relating to the natural oscillations of the tissue during a second duration having a start time and a finish time, the start time of the second duration being later than the start time of the first duration.

In soft biological tissues, the oscillation period is not constant because during the first period of natural oscillation, maximal amount of muscle mass takes part in the oscillation, along with the skin situated on top of the muscle as well as subcutaneous tissues. For further oscillations, the inclusion of the muscle mass in the oscillation decreases exponentially. Since at the end of the first oscillation period, most of the energy initially applied to the tissue by the actuator has been dispersed, proportionally less muscle mass is involved in further oscillations, leading to an increase in the oscillation frequency. At the same time, the mass of the skin and subcutaneous tissues involved in the oscillation remains practically unchanged. This means that in subsequent natural oscillation periods, less and less mass of the muscle is involved, but the mass of the skin and subcutaneous tissues involved is practically unchanged. This leads to only the skin undergoing natural oscillations in the last period(s). For example, if reliable results were obtained for only four oscillation periods, then for the last two periods, only skin and subcutaneous tissues are involved in the oscillations due to non-linearity of the process—the oscillation amplitude decreases exponentially and most of the increase in the natural frequency occurs after the first oscillation period, differing from the frequency of the first oscillation period by more than 10%.

The inventors have realized that the known approach of using the later oscillation periods to calculate a biomechanical parameter may produce incorrect results. By doing this, the results were not correct, since the difference between subsequent natural oscillation frequencies might be up to 10%. For example, if for natural oscillation periods were measured and the last two periods were used to calculate a particular biomechanical parameter, the result of the calculation would not be correct. This is because the best approximation to the whole tissue would be achieved by using the first natural oscillation period, when most of the tissue is involved in the oscillations. Since in the last natural oscillation periods proportionally less mass is involved in oscillations, then the parameters mostly describe skin and superficial layers, not the whole tissue.

On the other hand, according to the second aspect of the invention, more accurate results can be obtained.

In general, whatever the number of natural oscillation periods, the first period provides useful data relating to the biomechanical properties of a muscle and a last period provides useful data relating to the biomechanical properties of the skin.

The start time of the second duration may be at or later than the finish time of the first duration.

The first duration may be a first period of the natural oscillations of the tissue, and the second duration may be a second or subsequent period of the natural oscillations of the tissue.

A camera provided on the impulse applying device may be used to record a location on the tissue where the measurement of a biomechanical parameter thereof is being conducted.

An image recorded by the camera during a measurement may be shown on a screen, and the screen may also show a live image on the screen, either on a split screen or superimposed. This can enable measurements performed at a later point in time to be repeated in the same location where measurements were first conducted. The methods of this invention are useful in repeating measurements at intervals of time, in order to assess changes to the tissue of a subject over time. In the past, in order to ensure that the later measurements are carried out in the same place, a tattoo or other permanent mark has been made on the subject. By providing a camera no such marking is necessary.

A projector provided on the impulse applying device may be used to project information about the location on the tissue where a previous measurement of a biomechanical parameter was conducted. For example, a dot corresponding to a particular place on a recorded image from a previous measurement may be projected onto the tissue, a dot may be shown on a live image of the tissue on a screen, and the impulse applying device can be located by superimposing the dot shown on the screen on the dot as projected. Alternatively, or additionally, a recorded image may be shown on a screen, and the impulse applying device may be located by superimposing a live image on the recorded image.

In embodiments, the impulse applying device has a main body and an actuator for acting on the movable testing body, and wherein the actuator has a rotatable output member for applying torque to the movable testing body, the rotatable output member being non-rotatably connected to the movable testing body so that the movable testing body and the rotatable output member are rotatable about the same axis.

Such an actuator and movable testing body arrangement is of independent patentable significance.

Viewed from a third aspect, the invention provides an impulse applying device for noninvasively measuring a biomechanical parameter of soft biological tissue, including:
 a main body;
 a testing body movably supported by the main body and having an end portion to be placed in contact with a surface of the tissue and to apply a pre-pressure to the tissue to cause inward deformation of the tissue in an inward direction, the pre-pressure being caused by the weight of the movable body when in a reference orientation relative to the direction of gravity;
 an actuator for acting on the movable testing body; and
 an accelerometer rigidly attached to the movable testing body for determining the orientation of the movable testing body relative to the direction of gravity, and if the orientation differs from the reference orientation, for outputting a signal which causes the actuator to act on the movable body to cause compensation for deviation of the movable testing body from the reference orientation, so that the pre-pressure is the same as that caused by the weight of the movable body when in the reference orientation, wherein
 the actuator has a rotatable output member for applying torque to the movable testing body, the rotatable output member being non-rotatably connected to the movable testing body so that the movable testing body and the rotatable output member are rotatable about the same axis.

Such an arrangement can provide good precision in converting the torque of the actuator to torque of the movable testing body. This can provide increased precision of the pre-pressure compensation, which in turn can reduce measurement errors that could be caused when the impulse applying device is tilted by a user. As discussed earlier, the action by the e.g. actuator on the movable testing body may be positive or negative and high precision can be achieved in both cases.

The impulse applying device may further comprise a plurality of interchangeable end portions each having a different test end area for contact with the surface, wherein the end portion of the testing body belongs to the plurality of interchangeable end portions, and can be removed and replaced by one of the other end portions of the plurality thereof.

By changing the end portion the force per unit area acting as pre-pressure, or the force per unit area for a given impulse, may be modified. The end area of the plurality of interchangeable end portions may be in a range of 1 to 300 mm$^2$, for example.

Each of the plurality of end portions may have the same mass. Therefore, the mass of the movable testing body is unchanged when different end portions are used. This can ensure that only the end area is modified when changing the end portion, and hence the force per unit area, and not the weight of the movable body when in the reference orientation.

A further plurality of interchangeable end portions each having a different test end area for contact with the surface, wherein each of the further plurality of end portions has a second mass which is different from the mass of the first mentioned plurality of end portions.

Thus, a single impulse applying device may be used with more than one set of interchangeable end portions. This may be useful in applying the measurement method to different locations on the same subject, or on different subjects. For example, end portions with a small mass may be used in a pre-measurement process and any subsequent pre-measurement processes on a muscle on a child, and end portions with a larger mass may be used on the same muscle on an adult. The same applies to small or large animals in veterinary applications.

The actuator may be configured to apply torque to the movable testing body to generate impulses separated by a time interval. Those impulses may cause the end portion of the testing body to impart to the tissue an action with certain parameters. Each of the end portion actions may induce a response of the tissue, such as natural oscillations. Other features of the actuator, the impulses, end portion actions, the end portion as disclosed elsewhere herein may also apply in this aspect of the invention.

The discussion which follows, and the discussion elsewhere herein, is applicable to all aspects of the invention unless otherwise indicated.

The movable testing body may comprise a first arm extending radially from the axis of rotation, and a second arm connected to the first arm at a radial spacing from the axis, wherein the end portion to be placed in contact with the surface of the tissue belongs to the second arm. In use, angular rotation of the first arm about the axis of rotation causes corresponding rotation of the second arm about that axis. Because the first arm is connected to the second arm at a radial spacing (for example at least 5 cm), a small (for example up to 2°, preferably 1°) rotation of the first arm results in movement of the connection of the second arm to the first arm which is close to a linear movement, for practical purposes. Thus, in use, a rotation of the first arm of the movable testing body by the actuator may cause the end portion of the second arm in contact with the surface of the tissue to apply at least one impulse to the tissue. Similarly, torque applied by the actuator to the first arm may be transmitted to the second arm to cause the end portion of the second arm to apply pre-pressure.

The connection between the first arm and the second arm may be a pivotal connection. In use, the second arm may be arranged at an angle to the first arm, for example in a range of 80° to 100°, and it is generally preferred for it to be arranged substantially perpendicularly to the first arm. The end portion placed in contact with the tissue restrains the end portion from moving laterally of the tissue.

The end portion of the second arm may be interchangeably connected thereto, so that it may be replaced with another end portion, for example to provide an end portion with a different end area for placement in contact with the tissue. The second arm may therefore be provided with a suitable quick connect/disconnect connector, such as a bayonet connector.

Measuring the skin or muscle from a single point provides a result that does not characterize the whole organ. In assessing skeletal muscles or the skin condition of a body region, the measurements must be carried out on the corresponding region on a desired surface area. A necessary number of points over an entire region must be measured. Based on the results, a statistical assessment of the state and properties of the region can then be made. This applies to diagnostics as well as monitoring the effectiveness of the treatment. Early stages of formation of the pathological state can be detected during prolonged studies by the increasing trend in variance of the biomechanical parameters of the peripheral tissues.

The methods of the invention may therefore involve the impulse applying device applying pre-pressure and/or at least one impulse to the tissue at a plurality of locations in a region of interest. The methods may involve the impulse applying device applying pre-pressure and/or at least one impulse to the tissue at intervals of time, enabling assessment of any changes in the tissue over time.

When evaluating the characteristics that reflect the state and properties of the soft biological tissue, the parameters under observation ideally must remain unaffected during the course of the brief measurement. To meet this criterion, the duration of the measurement optimally should not allow for any changes resulting from the physiological processes. Next, the measurement must not induce any mechanical after-effects in the tissue. These can be caused—when inappropriate parameters are used—by the gravitational force of the movable testing body of the impulse applying device in addition to the force exerted by the actuator, resulting in residual deformation. The latter alters the properties of the tissue and thus the values of the parameters under observation. Moreover, the changes in the position of the impulse applying device in space must not affect the results. This implies that evaluating the after-effects during the measurement is crucial. It is also important to know the difference in the biomechanical parameters of the peripheral soft tissues and the tissues underneath the latter. Additionally, the state and properties of the muscles of different human body regions and also skin (epidermis and dermis) are different, potentially leading to different residual strains in those regions.

The impulse applying device may be provided with a handle. This is an important feature from an ergonomic point of view. A heavier handle reduces tremors in the hands of a person conducting the measurement.

The methods disclosed herein make it possible to measure:

Thin muscles (<3 mm);
Muscles having low mass (<20 g);
Non-palpable muscles;
Muscles situated underneath other muscles.

The issue of inconsistency between consecutive measurements is thought to be caused by residual deformation (or residual strain) in the tissue. This is a deformation generated by an end portion action that is capable of altering the determination of the value of a biomechanical parameter determined from a subsequent end portion action. Such deformation includes a visible deformation, for example when the displacement of the tissue does not fully recover by the time of the next measurement. However, there may be residual deformation present even where visually all the deformations have recovered, but not all processes inside the tissue, such as rearrangement or recovery of the collagen fibres, have come to an end. This means that it is difficult to assess the presence of residual deformation from a single impulse causing a single end portion action. However, when at least two impulses are generated the data can be compared. If the results are substantially similar, it can be concluded that there are no residual deformations leading to inaccurate results. This may be concluded for example from just two impulses by comparing those results, but a better check of consistency of results is obtained with a larger number of impulses, for example 5, or 10, or 15, or 20, or 25, or 30. The number of impulses used in the pre-measurement process, or a subsequent pre-measurement process, or a measurement process, may be in the range of 5-50 or 10-40 or 15-25.

The inventors have found that a biomechanical parameter that provides a good proxy for determining the presence or not of residual deformation is tissue stiffness. However, other biomechanical parameters may be used.

The method and system of the invention are broadly applicable to all areas of medicine and cosmetics where repeatable real time measurement of biomechanical parameters of soft biological tissues is required, including:
ONCOLOGY. Diagnosing and monitoring treatment of conditions such as sclerotic chronic graft-versus-host disease (cGVHD) following stem cell transplantation or Lymphedema following lymph node dissection;
MEDICAL DERMATOLOGY. Diagnosing and monitoring treatment of conditions such as systemic sclerosis (scleroderma) or stasis dermatitis
COSMETIC DERMATOLOGY. Anti-aging procedure monitoring including laser procedures, chemical peels; and
PHYSICAL AND SPORTS MEDICINE. Estimation of exercise-induced muscle damage.

The present invention in all its aspects is applicable to human subjects and animal subjects.

BRIEF DESCRIPTION OF THE DRAWINGS

Certain preferred embodiments of the invention will now be described by way of example and with reference to the accompanying drawings in which.

DETAILED DESCRIPTION

Figure 1:
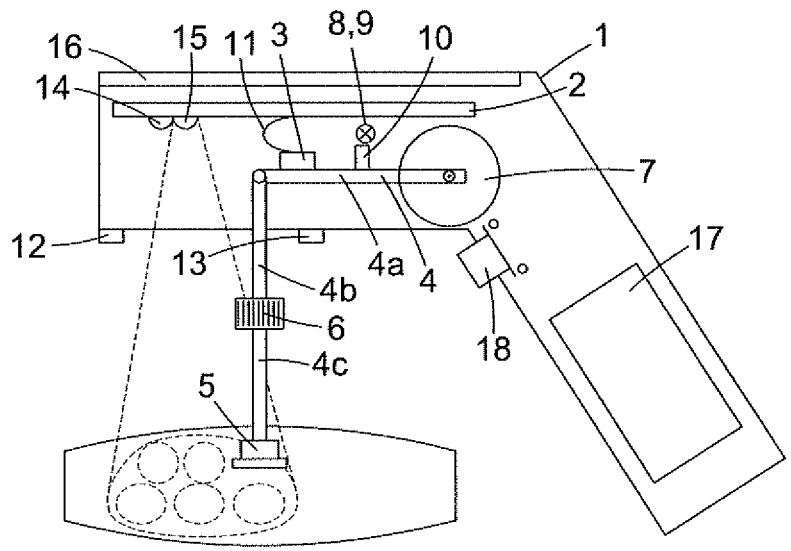
FIG. 1 is a schematic view of the impulse applying device.

The preferred embodiment of the impulse applying device to carry out real time measurement of the biomechanical parameters of soft biological tissue is shown schematically in FIG. 1.

The impulse applying device includes a casing with a handle 1, and data processing means in the form of a microprocessor and controller 2 used for directing the measurements, signal processing and calculating the biomechanical parameters.

A movable testing body 4 consists of a first arm portion 4a, a second arm portion 4b connected by a rotational joint to the first arm portion, and an end portion 4c connected by a bayonet connector 6 to the second arm portion 4b. The end portion has at its distal end a testing end 5 with a circular end area for contact with a measurement point of a region of tissue to be investigated. A sensor in the form of an accelerometer 3 is rigidly fixed to the first arm portion 4a of the movable testing body 4. The accelerometer is connected by wires 11 to the microprocessor and controller 2. The first arm portion 4a is rigidly fixed to a rotatable shaft of an actuator 7 supported on the casing 1, so that when the actuator is actuated and rotates by a certain amount (e.g. 1°) this in turn raises or lowers the first arm portion 4a of the movable testing body 4. The actuator is a rotary brushless torque actuator In this embodiment is a "Rotary BTA", size 2 EVM as available from Ermec S.L.

A light emitting diode 8 is arranged on the casing 1 on one side of the first arm portion 4a, and a photodiode 9 is arranged on the casing on the opposite side of the first arm portion 4a. A shutter 10 is fixed to the first arm portion at the same radial distance from the rotational axis of the actuator as the light emitting diode 8 and the photodiode 9, so that when the first arm portion 4a rotates relative to the casing the shutter either interrupts light between the light emitter and the photodiode, or allows the light to pass from the light emitter to the photodiode.

The device further includes mechanisms for sound 12 and light signals 13 used for monitoring the measurement process; an arresting system of the testing end (not shown); a video camera 14 to record the investigated region and measurement locations to determine the point of measurement; a projector 15; a display 16; a battery 17; and a switch 18 to initiate the measurement.

If the axis of the end portion 4c does not coincide with the direction of the earth's gravitational field, the battery 17 current is used to actuate the actuator 7. The current is controlled by a signal from the accelerometer 3, according to the orientation of the first arm portion 4a of the movable testing body in the earth's gravitational field. By activating the actuator 7 with constant current, a torque applied to the first arm portion 4a of the testing body for, to urge the second arm portion 4b and the end portion 4c substantially linearly, so that the testing end 5 is in turn urged against the biological tissue to provide compressive force. This compensates for the axis of the end portion 4c not being in the vertical position, so that the pre-pressure of the testing end 5 on the tissue is the same as it would be if the end portion 4c work vertically orientated. In this way, the actuator can provide compensation for deviation of the end portion 4c from the vertical.

After the testing end is positioned on the point of measurement on the tissue, when lowering the device towards the point of measurement, the shutter 10, positioned on the first arm portion 4a of the movable testing body 4, obstructs the beam of light directed from the light emitter 8 towards the photodiode 9. This triggers the video camera 14 and the actuator 7 for a pre-defined duration, inducing, at the point of measurement, a change in the shape of soft biological tissue followed by a quick release (end of actuation). The soft biological tissue responds to the mechanical stimulus via natural oscillation that can be determined, for instance, by the accelerometer 3. This is achieved by the accelerometer determining the acceleration of the first arm portion 4a of the movable testing body 4, from which it is possible to determine the acceleration of the testing end 5. Since this is in contact with the surface of the tissue, the response of the tissue to the mechanical stimulus, in particular the acceleration of the surface of the tissue, can be determined.

The device is operated by a computer program product stored in the processor memory and including portions of the software code adapted to perform the method by stages when the program is running in the processor.

The device's construction and software (computer program) enable the user to achieve repeatability and reliability of the measuring results, allowing simultaneous measurement of the parameters and processing of data as well as making statistically significant judgements in real time.

Operation of an embodiment to carry out a method for noninvasively measuring in real time the biomechanical parameters of at least one layer of soft biological tissue includes the following steps.

Phase A—Set-Up/Pre-Measurement Process (1) Selection of starting stimulation parameters (what seems reasonable for the patient/muscle concerned, for example the operator will start with a 3 mm diameter testing end and increase the diameter progressively if needed);

(2) The end portion of the movable testing body is put in contact with the skin (resting position) at the first pre-measurement point (anywhere in the area to be investigated);

(3) The device is lowered toward the pre-measurement point until it reaches its measurement position (the shutter obstructs the light passing between the light emitter and the photodiode);

(4) The microprocessor/controller is triggered (through the switch) and sends a signal to the actuator that generates a single short impulse that causes an action by the end portion on the tissue (stimulation of the soft biological tissue);

(5) Simultaneously, the microprocessor/controller activates the camera which takes a picture (measurement position is recorded);

(6) The acceleration sensor records the acceleration curve resulting from the co-oscillation of the movable testing body and the tissue, sends the information to the microprocessor/controller which calculates the stiffness of the soft biological tissue (any of the other biomechanical parameters could be used to determine their similarity but stiffness provides the best results)

(7) The device is raised to its resting position, so that the shutter no longer obstructs the light passing between the light emitter and the photodiode;

(8) Repetition of steps 1 to 7 as many times as necessary at time intervals (the number of repetitions can be programmed, but then it is needed to verify that enough data have been collected to perform a statistical analysis. An arithmetic mean is calculated, then the values that are >+/−2 SD are deleted and a new arithmetic mean based on the remaining values is calculated);

(9) If any of the non-deleted stiffness values >+/−0.5 SD, there is considered to be a residual strain with the parameters selected in (1), and so the stimulation parameters of the end portion actions are adjusted and steps (1) to (8) are repeated (in practice a testing end with a bigger diameter is selected and/or a shorter time of impulse is selected) in another pre-measurement point of the area (preferably at a point distant from the first one to avoid any effect of inadequate tissue recovery, i.e. residual strain) until all the non-deleted stiffness values <+/−0.5 SD which ends phase A.

Phase B—Measurements

(10) Selection of the stimulation parameters obtained in phase A (stimulation parameters that do not induce a residual strain, in the embodiment the selected end portion and duration of impulse);

(11) The end portion is put in contact (resting position) with the skin at the first measurement point (the data of the last pre-measurement point, without residual strain can be used as a first measurement point);

(12) The device is moved toward the measurement point until it reaches its measurement position (the shutter obstructs the light passing between the light emitter and the photodiode);

(13) The microprocessor/controller is triggered (through the switch) and sends a signal to the actuator that generates a single short impulse that causes an action by the end portion on the tissue (stimulation of the tissue);

(14) Simultaneously, the microprocessor/controller activates the camera which takes a picture (the measurement position is recorded);

(15) The accelerometer records the acceleration curve resulting from the co-oscillation of the movable testing body and the tissues, send the information to the microprocessor/controller which calculates the biomechanical parameters of the soft biological tissue of interest (i.e. preferably the skin and muscle) according to what is possible (depending on the number of periods of the acceleration curve, detailed below);

(16) The device returns to its resting position;

(17) Repetition of steps (11) to (16) as many times as necessary (the number of repetitions can be programmed, but then it is needed to verify that enough data to perform a statistical analysis have been collected. An arithmetic mean is calculated, then the values that are >+/−2 SD are deleted and a new arithmetic mean based on the remaining values is calculated. The new arithmetic mean is considered to be the stiffness value, i.e. the biomechanical parameter, which has been determined by the method);

(18) If the area requires more than one measurement point to be measured, as his preferred, the testing end of the device is put in contact (resting position) with the skin at a new measurement point of the area (following a logical scanning pattern, going from one point to the closest next one; since there is no residual strain, there is no need to go far, preferably the distance between 2 measurement points is calculated so that the circles of the end areas of the end portions of two consecutive positions are just touching (tangential)) and steps (12) to (17) are repeated;

(19) Step (18) is repeated as many times as necessary to cover the area of interest.

Figure 2:
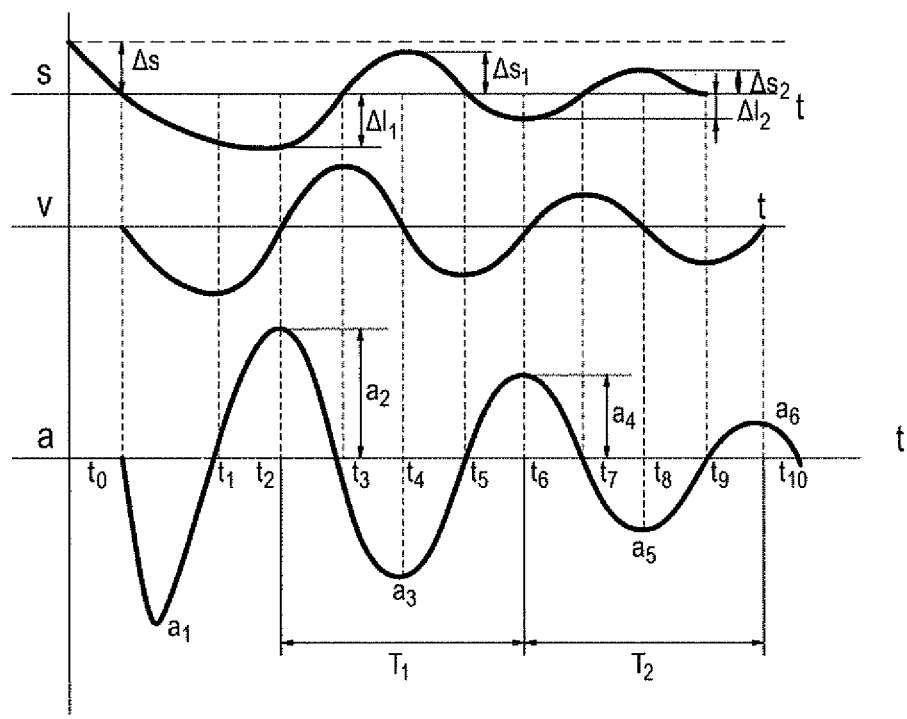
FIG. 2 is a graph showing the natural oscillation curve of the soft biological tissue subjected to an action by an end portion of a movable testing body of an impulse applying device.

The accelerometer 3 obtains acceleration data about the part of the movable testing body on which it is mounted during and after an impulse is generated to cause an end portion action. From this the natural oscillation curve of the soft biological tissue is obtained. This is shown in FIG. 2. This figure shows three graphs showing (from the bottom) respectively acceleration, velocity and displacement. The displacement of the testing end 5 of the end portion 4c is shown as the "s" curve. Acceleration is measured by the accelerometer 3 and is shown by the "a" curve, this is integrated to obtain the velocity "v" curve, and this is further integrated to obtain the "s" curve. Further details are provided below.

FIG. 2 shows the natural oscillation curve of the soft biological tissue.

a—the acceleration graph of the joint oscillation of the testing end and the soft biological tissue;

v—a graph depicting the velocity of the testing end;

s—a graph depicting the displacement of the testing end and the biological tissue during joint oscillation;

$t_0$—start of the active impact delivery by the actuator;

$t_1$—the time of maximal velocity of soft biological tissue deformation;

$t_2$—the beginning of the first period of natural oscillation, corresponding to the beginning of restoration of the shape of the soft biological tissue;

$t_3$—the end of the restoration of the shape of the soft biological tissue in the first period of natural oscillation;

$t_4$—the end of the overshoot $\Delta s_1$ in the restoration of the shape of the soft biological tissue during the first period of natural oscillation;

$t_5$—the beginning of the deformation in the first period of natural oscillation;

$t_6$—the beginning of the second period of natural oscillation;

$t_7$—the end of the restoration of the shape of the soft biological tissue in the second period of natural oscillation;

$t_8$—the end of the overshoot in the restoration of the shape of the soft biological tissue in the second period of natural oscillation;

$t_9$—the beginning of the deformation of the soft biological tissue in the second period of natural oscillation;

$t_{10}$—the end of the second period of natural oscillation;

$a_1$—the maximal acceleration during externally driven deformation of the soft biological tissue;

$a_2$—the maximal deceleration during the deformation of the soft biological tissue induced by a single mechanical impulse;

$a_3$—the acceleration at the time of maximal shape restoration overshoot of the soft biological tissue in the first period of natural oscillation;

$a_4$—the deceleration at the end of the first period of natural oscillation of the soft biological tissue;

$a_5$—the acceleration at the time of maximal shape restoration overshoot of the soft biological tissue in second period of natural oscillation;

$a_6$—the deceleration at the end of the second period of natural oscillation of the soft biological tissue;

$\Delta S$—static change in the shape of the soft biological tissue induced by pre-pressure;

$\Delta l_1$—the dynamic change in the shape of the soft biological tissue induced by the actuator;

$\Delta l_2$—the dynamic change in the shape of the soft biological tissue at the beginning of the second period of natural oscillation;

$\Delta S_1$—the overshoot in the restoration of the shape of the soft biological tissue in the first period of natural oscillation;

$\Delta S_2$—the overshoot in the restoration of the shape of the soft biological tissue in the second period of natural oscillation;

$t_1$—First Natural Oscillation Period;

$T_2$—Second Natural Oscillation Period.

Simultaneous but independent calculation of the biomechanical parameters for both superficial (cutaneous) and underlying deep tissues (including muscle) through the application of a single impulse may be carried out.

Combined superficial and deep tissue biomechanical parameters are calculated from the beginning of the acceleration curve until the end of the first natural oscillation period.

Figure 3:
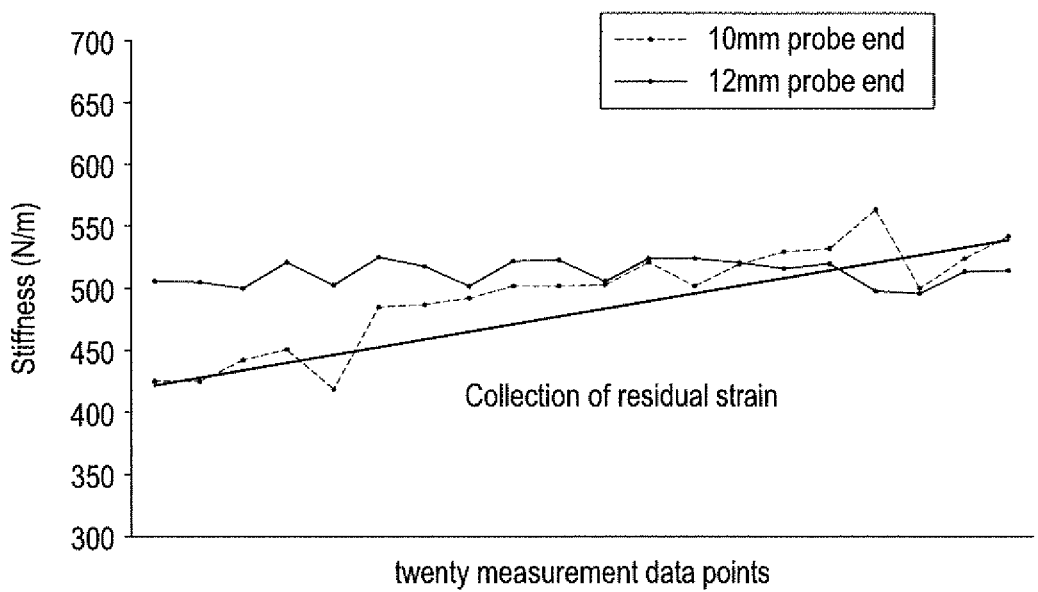
FIG. 3 is a graph showing stiffness values for 20 successive end portion actions spaced apart from each other by a time interval, for two different end portions.

FIG. 3 shows a graph of values of stiffness of tissue measured at a particular measurement point using 20 impulses spaced apart at a time interval of one second, resulting in 20 end portion actions. The graph shows two experiments, one using a testing end having a circular end area with a 10 mm diameter (10 mm probe end in the graph) and the other using a testing end having a circular end area with a 12 mm diameter (12 mm probe end in the graph). All impulses were the same, but the force per unit area applied by the smaller testing end was greater than the force per unit area applied by the larger testing end. Thus, there was a greater energy density.

It will be seen that over the course of the 20 impulses for the 10 mm testing end there was an increasing trend in stiffness. This would indicate that no reliable assessment of biomechanical parameters can be made, because of the collection of residual deformation (or residual strain) over the course of the plurality of measurements. The graph additionally shows a straight line indicating the increasing stiffness.

In contrast, over the course of the 20 impulses for the 12 mm testing end, the stiffness values did not increase in size. There was some fluctuation of the values but overall they stayed about the same. This would indicate that a reliable assessment of biomechanical parameters can be made, because no residual deformation has been collected.

Thus, the result in FIG. 3 illustrates the accumulation of mechanical after-effects caused by a testing end having an end area which is too small.

Figure 4:
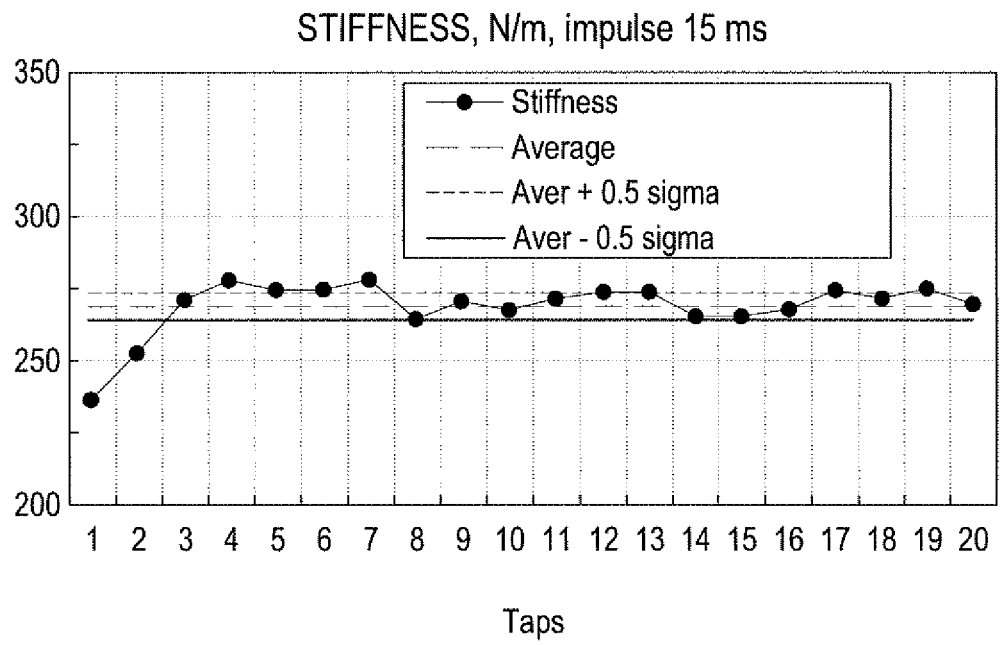
FIG. 4 is another graph showing stiffness values for 20 successive end portion actions spaced apart from each other by a time interval and using a different end portion.

FIG. 4 shows a graph of values of stiffness of tissue measured at a particular measure point using 20 impulses spaced apart at a time interval of one second, resulting in 20 end portion actions. Each impulse had a duration of 15 ms. This shows the stiffness values, a mean of those stiffness values and the +/−0.5 SD (standard deviation) range from that mean.

It will be seen that taps, or end portion actions, 1, 2, 3 or 4, exhibit a large increase in stiffness, caused by a duration of the actuator impulse which is too long, namely 15 ms.

Definitions

A biomechanical property is defined as a tissue's mechanical response to a mechanical impulse exerted on the tissue. By measuring the biomechanical properties of soft biological tissue, it is possible to foresee the danger of injury of a soft biological tissue. For instance, the breaking force (joint action of antagonistic muscles) resulting from repetitive trauma exerted on a soft biological tissue or the increase of muscle strain resulting from an increase in the rigidity of its collagen helicases may be detected by assessing the biomechanical parameters of these soft biological tissues, in particular the elasticity and creep. It will therefore be possible to treat the soft biological tissue before it is damaged.

Six Biomechanical Parameters of the Soft Biological Tissues

Of the biomechanical properties, stiffness characterizes the cooperative action of skeletal muscle antagonists during elementary motions (rotation of a body part around the axis of the joint) via the extent and character of the body part movement. As the stiffness of the collagen helices located in epimysium and skin increases, the body part movement amplitude decreases because the contraction of the skeletal muscle takes place during the transmission of mechanical energy due to the stiffening of the collagen helices located in the epimysium caused by rapid radial movement of myofilament cross bridges in the sarcomere (Vain, A.

(2006). *The phenomenon of mechanical stress transmission in skeletal muscles. Acta Academiae Olympiquae Estoniae*, 14, 38-48).

The change in the stiffness properties of collagen in a skeletal muscle is the first signal of a functional disorder of the morphological structure of the soft biological tissue.

Stiffness is a biomechanical property of skeletal muscle which consists in its resistance to any force changing its shape. The property inversely proportional to stiffness is compliance. The unit of measurement of both is N/m. How economical and how accurately coordinated a person's movements are depends on the stiffness of his/her skeletal muscles.

The second biomechanical property is elasticity. A decrease in skeletal muscle elasticity leads to the risk of mechanical trauma of the perimysium. The underlying mechanism lies in the worsened blood supply (a decreased blood volumetric flow rate) since the post-contraction shape recovery is slowed down due to the slowly decreasing intramuscular pressure. Oxygen-deprived muscle signals about this with sensation of pain. Such a condition leads to atrophy of a skeletal muscle as an organ.

The logarithmic decrement of a muscle's natural oscillation shows how much mechanical energy dissipates during one period of the muscle's natural oscillation. Hence, the elasticity of skeletal muscle (one of the biomechanical qualities of the muscle) can be characterized via the logarithmic decrement of the muscle's natural oscillation. Elasticity of soft biological tissue means its ability to restore its former shape after the deforming force is removed. The opposite term to elasticity is plasticity. If an elastic body changes its shape as a result of an impulse transmitted by external forces, then simultaneously mechanical energy of elasticity is stored in the morphological structures of skeletal muscle which possess elasticity properties. When the impulse from the deforming force ends, then the stored mechanical energy will restore the body's initial shape at a velocity that accords to the value of the logarithmic decrement—very quickly if the value approaches zero, and more slowly if the value is higher. Hence, in a device built to register the parameter characterizing elasticity, the effect of oscillation damping must be brought to a minimum.

In a working muscle, contraction and relaxation alternate. The duration of each may vary. Sometimes it may last only a split of a second. If the relaxation period is short and the muscle's logarithmic decrement is big, then the initial shape of skeletal muscle fails to be completely restored, the muscle's internal pressure falls insufficiently and, as a result, the outflow of venous blood from the muscle is slowed down. The time taken for the muscle's work capacity to be restored increases, its fatigue also increases, and the danger of a muscle overload trauma becomes a reality.

Of the viscoelastic properties, creep characterizes the decrease in temporal rate of deformation of a biomaterial under stress. As a result, the increase in mechanical stress precedes the change in shape (deformation) and leads to biomaterial failure after exceeding the ultimate strength of the material. In case of a constant force impulse, the increase in the mechanical stress relaxation time leads to a decrease in the speed of motion.

Creepability is a biomechanical property of soft biological tissue to deform permanently under constant stress. The creepability property of liquids has been quantitatively measured (U.S. Pat. No. 4,534,211, Molina O. G. 1985).

The creepability property of soft biological tissue might be characterized, for example, by the Deborah number $D_e$. The Deborah number is a quantity whose dimension is 1; this number is used to characterize the viscoelasticity of tissues (or creepability of materials). The latter is expressed as the ratio of relaxation time, $t_{material}$ representing the intrinsic properties of tissue, and the characteristic time scale of an experiment, or deformation time, $t_{process}$.

Muscle tone—the existence of mechanical tension in resting state characterizes the state of biological tissue and affects the volumetric flow rate of intratissue microcapillary blood circulation in resting state (upon recuperation of performance of the skeletal muscle).

Tone is defined as the mechanical stress of skeletal muscle with no voluntary contraction of the muscle. If we multiply the numerical value of the skeletal muscle stress by its cross-section area, we get the value of the force by which the tendon of skeletal muscle is pulling the periosteum of the bone.

There are three types of tone:
1) The passive resting tone—a state of skeletal muscle with no contraction in the muscle when the muscle is not balancing force torques on the observed joint axis caused by the force of gravity with its mechanical tension. There is no electromyographic (EMG) signal.
2) The resting tone (relaxation)—a state of mechanical stress (or tension) of skeletal muscle without voluntary contraction with EMG activity due to, for instance, an emotional or pathological condition. Such a state is more variable than the passive resting tone. The muscle force torques in antagonist muscles are balanced.
3) The postural tone is a state of skeletal muscle in which the muscle is balancing the force torques of body segments caused by the force of gravity in order to maintain the equilibrium position. When keeping the position, the muscle tension and stiffness are changing persistently, the variability of which is several times greater than in passive relaxed tone. The state of mechanical tension and stiffness level are also significantly higher.

The tone of the skeletal muscle cannot be decreased at will. The level of the tone depends on intramuscular pressure—the higher the intramuscular pressure, the greater the mechanical tensile stress in the muscle (Vain A. 2006 The Phenomenon of Mechanical Stress Transmission in Skeletal Muscles. Acta Academiae Olympiquae Estoniae, Vol 14, No. 1/2 pp. 38-48). If the intramuscular pressure is high, the outflow of venous blood from the muscle will slow down because the veins have no substantial internal blood pressure and when the intramuscular pressure rises, then the veins' cross-section area will decrease. In the case of passive rest, this causes the situation that skeletal muscles' ability to work is restored slowly. Additionally, the ergonomic efficiency of muscle activity in performing movements will decrease since the momentum of force caused by antagonist muscles for turning the part of the body on the axis of the joint increases on account of the work needed to stretch the antagonist muscles. The amount of work A done when stretching the antagonist muscles can be calculated by the following formula:

$A = F_{resistance} * S (J)$ where $F_{resistance}$—resistant force (N), s—extent of stretch (m), whereas $F_{resistance} = 2 * V * f * D * m (N)$, where v—speed of stretching (m/s), f—muscle's natural oscillation frequency (Hz), D—logarithmic decrement of a muscle's natural oscillation, m—mass of the muscle being stretched (kg).

It is technically complicated to measure skeletal muscle's state of mechanical stress. However, there has been revealed a functional connection between a material's natural oscillation frequency and its mechanical stress, which in the case of short-term measurements makes it possible to characterize the mechanical state of skeletal muscle.

Coefficient of resilience characterizes the maximum energy that can be absorbed per unit volume without creating a permanent deformation (within the elastic limit).

Mechanical Stress Relaxation Time

The relaxation property of skeletal muscle tissue is defined as the tissue's ability to relieve itself of mechanical stress in the case of constant length.

When used independently, the biomechanical parameters of the soft biological tissues listed above do not provide a thorough understanding of the condition of the organ. Only when all the previously mentioned parameters are taken into account, the present state of the soft biological tissue can be assessed.

Other definitions (non-exhaustive list):

Real Time

In embodiments of the invention, the results of the pre-measurement process, any subsequent pre-measurement process and a measurement process can be obtained in real time. This is not the case in known impulse applying devices, where after the measurement it was necessary to plug the device into a computer to see any results. In this light, sampling frequency of 1 Hz and 30 kHz are both "real time".

Soft Biological Tissues

All living tissues that exhibit natural oscillation upon subjecting it to a single mechanical impulse, for example: epithelial, subcutaneous, fatty, connective, muscle, nerve and cellular tissue.

List of tissues encompassed by the term "soft biological tissues": muscles (different types), skin (epidermis +dermis), hypoderm (or subcutaneous tissue), tendons, ligaments, fascia, fat, fibrous tissues, connective tissues.

Layer (of Soft Biological Tissue)

The layers are defined by the self-oscillation periods, which also reflect on the mass of the tissue involved in the natural oscillation. This means that the "first" layer is the amount of tissue that mainly affects the parameters calculated from the first period of natural oscillation, which has the lowest oscillation frequency and has the highest amount of tissue mass involved. Subsequently next "layers" (or periods) have higher oscillation frequencies and less mass is involved, up to the last layers/periods, where only skin is involved.

For example, in the case of an acceleration curve that has 14 peaks, a first layer is calculated from maxima t6–t2, a second layer is t10–t6 and a third (and last) layer is t14–t10.

The layers are theoretical, not physical layers, but still approximately correlate to the actual physical layers: first periods of natural oscillation (first layers) characterize mainly the muscle and last periods (last layers) characterize mainly skin.

The Acceleration Curve

The acceleration curve is a curve showing the acceleration of the testing end during the pre-measurement process or measurement process ("measurement"). Since the testing end is in contact with the soft biological tissue, the curve depicts the total acceleration of the testing end + the tissue it is in contact with.

Natural Oscillation (Period, Frequency)

Oscillation induced by a single external impulse

This can be seen as the portion on the acceleration curve/graph that begins immediately after the end of actuation (mechanical impulse), starting at t2 in FIG. 2.

Longitudinal Measurement

Measurement where the measuring device is removed from the measuring area (area of tissue) and the measurement is repeated later on the same area. This is in contrast with doing subsequent measurements on the same area without removing the device. For example, if an area is measured during 1 minute and the device is removed for 1 minute and then the device is used to measure again on the same area for 1 minute (total of 3 minutes), this is a longitudinal measurement. If the same area is measured during the course of 10 minutes without removing the measurement device from the area—this is not a longitudinal measurement.

Formulas for calculation of the biomechanical parameters of soft biological tissue are provided in TABLE 1.

i=1, 2, 3, etc.—sequential number of the natural oscillation period ($T_1$, $T_2$ in the FIG. 2) suitable for calculations.

$$k=i-1$$

$$6_i = \frac{a_{2i} m_t}{L},$$

where mt is the mass of the movable testing body and L is the area of the testing end [m$^2$] and $$\varepsilon_i = \frac{\Delta l_i}{\Delta S_i + \Delta l_i}$$

TABLE 1

| Parameter | Generalized formula | I period | II period | III period |
|---|---|---|---|---|
| Natural oscillation frequency [Hz] | $F_i = \dfrac{1}{t_{4i+2} - t_{4i-2}}$ | $F_1 = \dfrac{1}{t_6 - t_2}$ | $F_2 = \dfrac{1}{t_{10} - t_6}$ | $F_3 = \dfrac{1}{t_{14} - t_{10}}$ |
| Dynamic stiffness [N/m] | $S_i = \dfrac{m_t * a_{2i}}{\Delta l_i}$ | $S_1 = \dfrac{m_t * a_2}{\Delta l_1}$ | $S_2 = \dfrac{m_t * a_4}{\Delta l_2}$ | $S_3 = \dfrac{m_t * a_6}{\Delta l_3}$ |
| Logarithmic decrement | $\Theta_i = \ln\left(\dfrac{a_{2k+2}}{a_{2k+4}}\right)$ | $\Theta_1 = \ln\left(\dfrac{a_2}{a_4}\right)$ | $\Theta_2 = \ln\left(\dfrac{a_4}{a_6}\right)$ | $\Theta_3 = \ln\left(\dfrac{a_6}{a_8}\right)$ |
| Mechanical stress relaxation | $R_1 = t_{4i-1} - t_{4i-2}$ | $R_1 = t_3 - t_2$ | $R_2 = t_7 - t_6$ | $R_3 = t_{11} - t_{10}$ |

TABLE 1-continued

| Parameter | Generalized formula | I period | II period | III period |
|---|---|---|---|---|
| time [ms] | | | | |
| Deborah number | $C_i = \begin{cases} R_i/(t_{2i} - t_0) & i = 1 \\ R_i/(t_{4i-2} - t_{4i-3}), & i \neq 1 \end{cases}$ | $C_1 = \dfrac{R_1}{t_2 - t_0}$ | $C_2 = \dfrac{R_2}{t_6 - t_5}$ | $C_3 = \dfrac{R_3}{t_{10} - t_9}$ |
| Coefficient of resilience [J/m^3] | $Re_i = \dfrac{6_i \varepsilon_i}{2}$ | $Re_1 = \dfrac{6_1 \varepsilon_1}{2}$ | $Re_2 = \dfrac{6_2 \varepsilon_2}{2}$ | $Re_3 = \dfrac{6_3 \varepsilon_3}{2}$ |

Calculation of Biomechanical Parameters of Different Portions of Soft Biological Tissues The oscillation curve can be divided in distinct portions (based on the curve of FIG. 2): the mechanical impulse (from $t_0$ to $t_2$) and subsequent natural oscillation periods: first period $T_1$ (from $t_2$ to $t_6$, corresponding to $a_2$ to $a_4$), second period $T_2$ (from $t_6$ to $t_{10}$, corresponding to $a_4$ to $a_6$), etc.

The portion of acceleration curve that is used in the calculations is from the beginning of the curve ($t_0$) up to the peak $a_n$, as long as $a_n > a_2 * \sigma_s$, where $a_n$—the sequential local maxima/minima, counting from the beginning of the acceleration curve, n=1, 2, 3, etc.; and $a_2$—the maximal deceleration during the first natural oscillation period of the soft biological tissue.

1) If no natural oscillation period is recorded—the stiffness of only the superficial tissue (the skin) is calculated, using the second half-period ($a_1$-$a_2$) of the active (external) deformation period ($t_0$-$t_2$ on FIG. 5).

2) If at least a quarter of the first natural oscillation period is obtained, then according to how much of a given natural oscillation is obtained, for every natural oscillation period $T_i$, can be calculated:

a. The stiffness of the portion of biological tissue that contributes to the natural oscillations in period $T_i$ based on the second half-period of the previous oscillation period $T_{i-1}$.

b. The Mechanical stress relaxation time, and the Deborah number (which characterizes creep) of the muscle based on the first quarter of the period $T_i$.

c. The coefficient of resilience, based on the first half of the period Ti;

d. The logarithmic decrement and the natural oscillation frequency, based on the whole period $T_i$.

Presented differently, for a given period Ti, it is possible to:

1) Use the second half-period of the previous oscillation period (which is a natural oscillation in cases of $T_2, T_3 \ldots T_i$, or the external mechanical deformation period $t_0$-$t_2$ in the case of $T_1$) to calculate the stiffness of the tissue involved in natural oscillation in period $T_i$ (i=1, 2, 3 . . . ).

2) Use the first quarter of the period to additionally calculate mechanical stress relaxation time, and Deborah number of the tissue involved in natural oscillation in period $T_i$.

3) Use the first half of the period $T_i$ to calculate the coefficient of resilience for the tissue involved in natural oscillation in period $T_i$.

4) Use the full period Ti to additionally calculate the logarithmic decrement and the natural oscillation frequency for the tissue involved in natural oscillation in period $T_i$.

The invention claimed is:

1. A method of noninvasively measuring a biomechanical parameter of soft biological tissue, wherein the biomechanical parameter comprises one or more of natural oscillation frequency, dynamic stiffness, logarithmic decrement, mechanical stress relaxation time, Deborah number and coefficient of resilience, using an impulse applying device comprising a movable testing body having an end portion to be placed in contact with a surface of the tissue and a rotary actuator, the method comprising a pre-measurement process which comprises:

the impulse applying device applying a pre-pressure to the surface of the tissue via the end portion in contact with the surface of the tissue;

whilst maintaining said pre-pressure, the impulse applying device generating, by the rotary actuator, at least two impulses separated by a time interval, each impulse causing the end portion to impart to the tissue an action with certain parameters, and each of the end portion actions inducing a response of the tissue;

calculating a value of the biomechanical parameter of the tissue from the response induced by each end portion action, wherein the biomechanical parameter comprises at least dynamic stiffness; and calculating if the value of the biomechanical parameter calculated from the response induced by each end portion action are sufficiently similar to each other to indicate that the pre-pressure, the parameters of each end portion action and the time interval are acceptable for a measurement process to be conducted on the surface of the tissue using the same pre-pressure, a plurality of end portion actions with the same parameters and the same time interval, wherein, if the determination is that the pre-pressure, the parameters of each end portion action and the time interval are not acceptable for the measurement process to be conducted using the same pre-pressure, parameters of each end portion action and time interval, the method further comprises a subsequent pre-measurement process which comprises:

the impulse applying device applying to the surface of the tissue a subsequent pre-pressure, and whilst maintaining said subsequent pre-pressure, generating at least two subsequent impulses separated by a subsequent time interval each to cause the end portion to impart to the tissue a subsequent end portion action, at least one of the subsequent pre-pressure, the parameters of each subsequent end portion actions and the subsequent time interval being modified;

calculating the value of the biomechanical parameter of the tissue from the response induced by each subsequent end portion action; and calculating if the value of the biomechanical parameter determined from the response induced by each subsequent end portion action are sufficiently similar to each other to indicate that the subsequent pre-pressure, the parameters of each subsequent end portion action and the subsequent time interval are acceptable for the measurement process to be conducted on the surface of the tissue using the same subsequent pre-pressure, a plurality of end portion actions with the same parameters as the subsequent end portion actions, and the same time interval as the subsequent time interval, wherein the pre-measurement process further comprises:
for each of the end portion actions, calculating the value of the dynamic stiffness of the tissue to obtain a plurality of values of dynamic stiffness each corresponding to a respective end portion action; and
said calculating if the plurality of values of dynamic stiffness calculated from the response induced by each end portion action are sufficiently similar being done by performing a statistical analysis to determine a variation of the plurality of values of dynamic stiffness.

2. The method as claimed in claim 1, wherein the subsequent pre-pressure is modified compared to the pre-pressure used in the pre-measurement process carried out first.

3. The method as claimed in claim 1, wherein the parameter of each subsequent end portion action which is modified comprises a force per unit area applied by the end portion of the testing body to the tissue.

4. The method as claimed in claim 3, wherein the impulse applying device uses a second, different end portion to apply the at least two subsequent impulses, the second end portion having a different end area from that of an end area of the end portion used in the pre-measurement process carried out first.

5. The method as claimed in claim 1, wherein the parameters of each subsequent end portion action which are modified comprise a duration of the subsequent end portion actions.

6. The method as claimed in claim 1, wherein the parameters of each subsequent end portion action which are modified comprise the time interval separating the at least two impulses.

7. The method as claimed in claim 1, wherein the statistical analysis comprises:
calculating a mean of the plurality of values of dynamic stiffness;
calculating a standard deviation of the plurality of values of dynamic stiffness;
selecting and discarding any of the plurality of values of dynamic stiffness that are greater than or less than the mean by more than a multiplier of the standard deviation;
calculating a new mean of the plurality of values of dynamic stiffness not discarded;
calculating a new standard deviation of the plurality of values of dynamic stiffness not discarded;
wherein the variation determined by the statistical analysis comprises said new standard deviation.

8. The method as claimed in claim 7, further comprising:
determining if all of the plurality of values of dynamic stiffness which are not discarded are inside an acceptable range, said acceptable range being +/−a multiplier of the new standard deviation from the new mean; and
if all of the plurality of values of dynamic stiffness are inside the acceptable range, calculating that the pre-pressure and the parameters of each end portion action are acceptable for the measurement process to be conducted.

9. The method as claimed in claim 1, wherein the biomechanical parameter of the tissue is its dynamic stiffness and the dynamic stiffness $S_1$ is defined by the formula:

$$S_1 = \frac{m_t * a_2}{\Delta l_1}$$

where
$m_t$ is an effective mass of the movable testing body, the effective mass being a mass value as if a whole of the movable testing body is being decelerated by $a_2$,
$a_2$ is a maximum deceleration of the end portion, occurring when the tissue is maximally inwardly deformed by the at least two impulses, and
$\Delta l_1$ is a maximum inward deformation of the tissue caused by each at least one end portion action.

10. The method as claimed in claim 1, wherein the method comprises conducting said measurement process, said measurement process comprising:
the impulse applying device applying the pre-pressure to the surface of the tissue via the end portion in contact with the surface of the tissue, the pre-pressure being the same as that used in the first or the subsequent pre-measurement process; and
whilst maintaining said pre-pressure, the impulse applying device generating the at least two impulses causing the end portion to impart to the tissue the action with certain parameters, the certain parameters being the same as those used in the first or a subsequent pre-measurement process, and the end portion action inducing the response in the form of natural oscillations of the tissue; and
wherein the method further comprises:
calculating the biomechanical parameter of a first portion of the tissue extending from the surface of the tissue to a first depth, based on assessing data relating to the natural oscillations of the tissue during a first duration having a start time and a finish time; and
calculating the biomechanical parameter of a second portion of the tissue extending from the surface of the tissue to a second depth which is less than the first depth, based on assessing data relating to the natural oscillations of the tissue during a second duration having a start time and a finish time, the start time of the second duration being later than the start time of the first duration.

11. The method as claimed in claim 10, wherein the start time of the second duration is at or later than the finish time of the first duration.

12. The method as claimed in claim 1, comprising using a camera provided on the impulse applying device to record a location on the tissue where the measurement of the biomechanical parameters thereof is being conducted.

13. The method as claimed in claim 12, comprising using a projector provided on the impulse applying device to project information about the location on the tissue where a previous measurement of the biomechanical parameter was conducted.

14. The method as claimed in claim 1, wherein the rotary actuator has a rotatable output member for applying torque to the movable testing body, the rotatable output member being non-rotatably connected to the movable testing body so that the movable testing body and the rotatable output member are rotatable about a same axis.

15. The impulse applying device for noninvasively measuring the biomechanical parameter of soft biological tissue according to the method of claim 1, comprising:
- a main body;
- the moveable testing body, movably supported by the main body and having the end portion to be placed in contact with the surface of the tissue and to apply the pre-pressure to the tissue to cause inward deformation of the tissue in an inward direction, the pre-pressure being caused by the weight of the movable testing body when in a reference orientation relative to a direction of gravity;
- the rotary actuator for acting on the movable testing body; and
- an accelerometer rigidly attached to the movable testing body for determining an orientation of the movable testing body relative to the direction of gravity, and if the orientation differs from the reference orientation, for outputting a signal which causes the actuator to act on the movable body to cause compensation for deviation of the movable testing body from the reference orientation, so that the pre-pressure is the same as that caused by the weight of the movable body when in the reference orientation, wherein the rotary actuator has a rotatable output member for applying torque to the movable testing body, the rotatable output member being non-rotatably connected to the movable testing body so that the movable testing body and the rotatable output member are rotatable about the same axis.

16. The impulse applying device as claimed in claim 15, further comprising a plurality of interchangeable end portions each having a different test end area for contact with the surface, wherein said end portion of the moveable testing body belongs to said plurality of interchangeable end portions, and can be removed and replaced by one of the other end portions of said plurality thereof.

17. The impulse applying device as claimed in claim 16, wherein each of the plurality of end portions has a same mass.

18. The impulse applying device as claimed in claim 17, comprising a further plurality of interchangeable end portions each having a different test end area for contact with the surface, wherein each of the further plurality of end portions has a second area which is different from the area of the first mentioned plurality of end portions.

* * * * *